US009378064B2

(12) United States Patent
Dees, Jr. et al.

(10) Patent No.: US 9,378,064 B2
(45) Date of Patent: Jun. 28, 2016

(54) ORCHESTRATION MANAGEMENT OF INFORMATION TECHNOLOGY

(71) Applicant: BANK OF AMERICA CORPORATION, Charlotte, NC (US)

(72) Inventors: Prentice O. Dees, Jr., Atlanta, GA (US); Thomas H. Davies, Concord, CA (US); Eric Tykeson, Agoura Hills, CA (US); John Becsi, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 767 days.

(21) Appl. No.: 13/678,029

(22) Filed: Nov. 15, 2012

(65) Prior Publication Data

US 2014/0136708 A1 May 15, 2014

(51) Int. Cl.
G06F 15/173 (2006.01)
G06F 9/50 (2006.01)
H04L 12/24 (2006.01)

(52) U.S. Cl.
CPC ........... *G06F 9/5072* (2013.01); *H04L 41/5041* (2013.01)

(58) Field of Classification Search
CPC .................. G06F 9/5072; H04L 41/5041
USPC ........................................................ 709/226
See application file for complete search history.

(56) References Cited

U.S. PATENT DOCUMENTS

| 8,046,767 | B2 * | 10/2011 | Rolia et al. ............... 718/104 |
| 8,171,201 | B1 | 5/2012 | Edwards, Sr. |
| 8,335,851 | B1 * | 12/2012 | Vendrow .................. 709/226 |
| 8,572,611 | B2 | 10/2013 | Eide et al. |
| 2003/0187982 | A1 * | 10/2003 | Petit ......................... 709/225 |
| 2004/0181794 | A1 * | 9/2004 | Coleman et al. ........... 718/104 |
| 2006/0101224 | A1 * | 5/2006 | Shah et al. ................ 711/173 |
| 2009/0254660 | A1 | 10/2009 | Hanson et al. |
| 2010/0057913 | A1 | 3/2010 | DeHaan |
| 2011/0202909 | A1 * | 8/2011 | Meijer et al. .............. 717/151 |
| 2011/0213884 | A1 * | 9/2011 | Ferris et al. ............... 709/226 |
| 2012/0072579 | A1 * | 3/2012 | Teather .................... 709/224 |
| 2012/0102291 | A1 | 4/2012 | Cherian et al. |

(Continued)

OTHER PUBLICATIONS

Search Report under Section 17(5) for United Kingdom Patent Application No. GB1319927.8 completed on Apr. 14, 2014.

*Primary Examiner* — Brian J Gillis
*Assistant Examiner* — Steve Lin
(74) *Attorney, Agent, or Firm* — Michael A. Springs; Moore & Van Allen PLLC; Nicholas C. Russell

(57) ABSTRACT

Embodiments of the invention are directed to a system, method, or computer program product for an orchestration management database (OMDB). The OMDB provides for aggregation of vendor and bank data necessary for information technology infrastructure deployment, management, and federation. Utilizing cloud computing technology the OMDB provides an aggregation of all data necessary for information technology infrastructures within an entity into one useable database that dramatically simplifies the ability to do core functions and integrate external vendors and components with the entity's information technology infrastructure. In this way, the present invention modularly stores data required for an entity's information technology infrastructure and allows for easy deployment, intelligent monitoring, federation of data, and feedback associated with all aspects of the entity's information technology infrastructure.

18 Claims, 11 Drawing Sheets

(56) References Cited

U.S. PATENT DOCUMENTS

2012/0137002 A1* 5/2012 Ferris et al. ................ 709/226
2012/0272237 A1 10/2012 Baron
2013/0198740 A1 8/2013 Arroyo et al.
2013/0232254 A1* 9/2013 Srikanth et al. ............... 709/224
2013/0275975 A1 10/2013 Masuda et al.

* cited by examiner

ORCHESTRATION MANAGEMENT OF INFORMATION TECHNOLOGY

BACKGROUND

Traditional information technology infrastructures for entities usually require several operating environments, vendor resource deployment, authentication repositories and mechanisms, and several application servers working together in order to operate a large entity's information technology.

Furthermore installing and/or implementing core functions, such as new software or hardware within an entity's information technology infrastructure requires several time consuming steps. For example, ordering and installing a new physical server and/or associate work station requires a logical process to load the necessary operating systems, secure the server, install applications, ensure licensing from proper vendors, and the like. In some cases this process can take several weeks or months to become operational for all users within the entity.

Furthermore, the new physical server and/or associate work station may have hardware or software features that provide functionality to the physical server and/or associate work station that are not being utilized. For example, the associate work station may have a large amount of memory that the associate may have requested, but may not be utilized. Thus, the entity may be paying for information technology infrastructures that are not being utilized to their fullest capacity.

Therefore, a need exists for a logical management system of information technologies within an entity that drastically limits the time required for core functions to be completed and intelligently monitors the core functions once implemented.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the present invention address the above needs and/or achieve other advantages by providing apparatus (e.g., a system, computer program product, and/or other devices) and methods for providing an orchestration management database for aggregating vendor and bank data necessary for information technology infrastructure deployment and federation. Thus, the orchestration management database provides an aggregation of all information into one useable database that dramatically simplifies the ability to do core functions as well as to integrate external vendors and components with the entity's information technology infrastructure and monitoring of the same.

In some embodiments, the system may provide an information technology cloud for vendors and entities to place information technology resources, such as data, hardware, and/or software, on the cloud for utilization within an entity's information technology infrastructure.

In some embodiments, the information on the cloud may be modularized via the orchestration management database (OMDB), such that all critical data necessary for information technology infrastructure deployment, monitoring, and federation is stored and/or provided by the OMDB. The OMDB is capable of handling the dynamic rate of data change that occurs in an entity information technology environment and is able to connect all of the components together as an intersection point of data. This provides an aggregate module location of all information. In some embodiments, the OMDB may also modularize user workstations, vendors, and other aspects of the information technology infrastructure such that critical data required for information technology throughout an entity may be centrally located for easy monitoring, deployment, federation, and the like.

In some embodiments, the centralized OMDB in tandem with other resource managers provides for touch less deployment of information technology infrastructure components. In this way, instead of taking several information technology professionals several days/weeks/months to set up a new server, operating system, user workstation, or the like the OMDB is able to provide the critical information technology data necessary to deploy that information technology infrastructure component within minutes and without having to utilize information technology professionals. By utilizing the cloud in conjunction with the OMDB all critical information technology resources are quickly accessible and implementable onto a newly deployed information technology infrastructure component. As such, the OMDB provides an aggregation of the information technology resources necessary to build and/or deploy information technology systems within the information technology infrastructure.

In some embodiments, the centralized OMDB is capable of intelligent management of the information technology infrastructure, including the cloud and user systems. Intelligent management includes monitoring, providing feedback for the information technology infrastructure, and aiding in the federation of data. This management ensures the proper building of information technology infrastructure components and the day-to-day operation of the cloud. For example, if a new IP address is required for a new information technology infrastructure component, the intelligent management may not select an IP address within the entity that was recently closed. But instead may select an IP address within the entity that has been closed for several days. This way, if that IP address was closed by accident, the information technology component that previously had the IP address may be able to retrieve and revive the address for that prior component. This cycling algorithm ensures that the information technology resources selected to be implemented during a build of an information technology component may not be recalled for a prior implementation.

Furthermore, the monitoring of the information technology infrastructure allows for monitoring of every information technology infrastructure component built, the information technology resources used for the builds, the data on the cloud, the inventory available, capacity available, performance, billing, building sequences, or the like that may be necessary to build and/or operate an information technology infrastructure for an entity.

The intelligent management also provides for feedback related to the OMDB and corresponding information technology infrastructure, including the cloud and user systems. In this way, users may request and obtain in near real-time feedback related to the information technology infrastructure. For example, a user may request feedback related to the capacity available on the user's system, a line-of-business set of systems, or an entire entity's system. Therefore, a user may be able to receive feedback based on the monitoring of either a single component within the information technology infrastructure or the entire information technology infrastructure. In some embodiments, the feedback may be provided to a user based on a user recommendation of feedback. In other embodiments, the system may automatically provide feedback to a user based on an event occurring within the information technology infrastructure.

In some embodiments, the OMDB system provides for the federation of information technology resources. Federation of information technology resources allows the OMDB system to push and/or pull information technology resources to/from the OMDB, cloud, user systems, and the like. In this way, if a component within the information technology infrastructure is not utilizing all information technology resources provided to it, the OMDB may be able to pull that data from the component and push it to another component that may utilize the data. For example, if a user system is provided with 4 GB of memory, however monitoring shows that that user system only ever utilizes 1 GB of memory. The OMDB may notify other components which can re-allocate the memory resources on the user system more efficiently. Furthermore, the federation aspect of the OMDB system allows the system to communicate with external systems when information technology resources are required from the external system for building an information technology component within the information technology infrastructure.

Embodiments of the invention relate to systems, methods, and computer program products for providing aggregation of vendor and entity data for an information technology infrastructure, the method comprising: receiving information technology resources at a platform, wherein the information technology resources comprises data that an entity requests for use within the information technology infrastructure; determining the information technology resources on the platform necessary for deploying and building components within the information technology infrastructure, such that the information technology resources are deployable in a step-by-step sequence for building the components within the information technology infrastructure; creating a dynamic list of the information technology resources and step-by-step sequence for building the components, wherein the dynamic list is stored in real-time; deploying the information technology resources in the step-by-step sequence for building of a user system within the information technology infrastructure, wherein the deployment is automated and does not require user activation or involvement to deploy the information technology resources from the platform; monitoring, in real-time, the information technology infrastructure including the platform, user systems, and the information technology resources being utilized within the information technology infrastructure; and federating information technology resources from a first user system that is determined to be underutilizing information technology resources, the underutilized information technology resource may be removed from the first user system and queued to be cycled into a second user system.

In some embodiments, the monitoring of the information technology infrastructure further includes monitoring, in real-time, the inventory, capacity, performance, billing, and sequence of the components of the information technology infrastructure.

In some embodiments, the platform comprises a cloud, wherein the cloud allows for real-time access to a shared pool of information technology resources, wherein the cloud is accessible by vendors and users of the information technology infrastructure.

In some embodiments, determining the information technology resources on the platform necessary for deploying and building components within the information technology infrastructure further comprises: determining information technology resources required for deploying and building components within the information technology infrastructure that is not on the platform; communicating with external sources to obtain the information technology resources required for deploying and building components within the information technology infrastructure that is not on the platform; and providing, to the platform the information technology resources required for deploying and building components within the information technology infrastructure that is not on the platform.

Embodiments of the invention further comprise providing real-time storage via, in some embodiments, an offline database and maintenance of the information technology resources, the platform, the information technology infrastructure, and individual user systems of the information technology resources, wherein the maintenance is determined independent of user indication of a problem, via the monitoring of the information technology infrastructure.

Embodiments of the invention further comprise an intelligent platform manager that determines communications between the user system and the platform.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
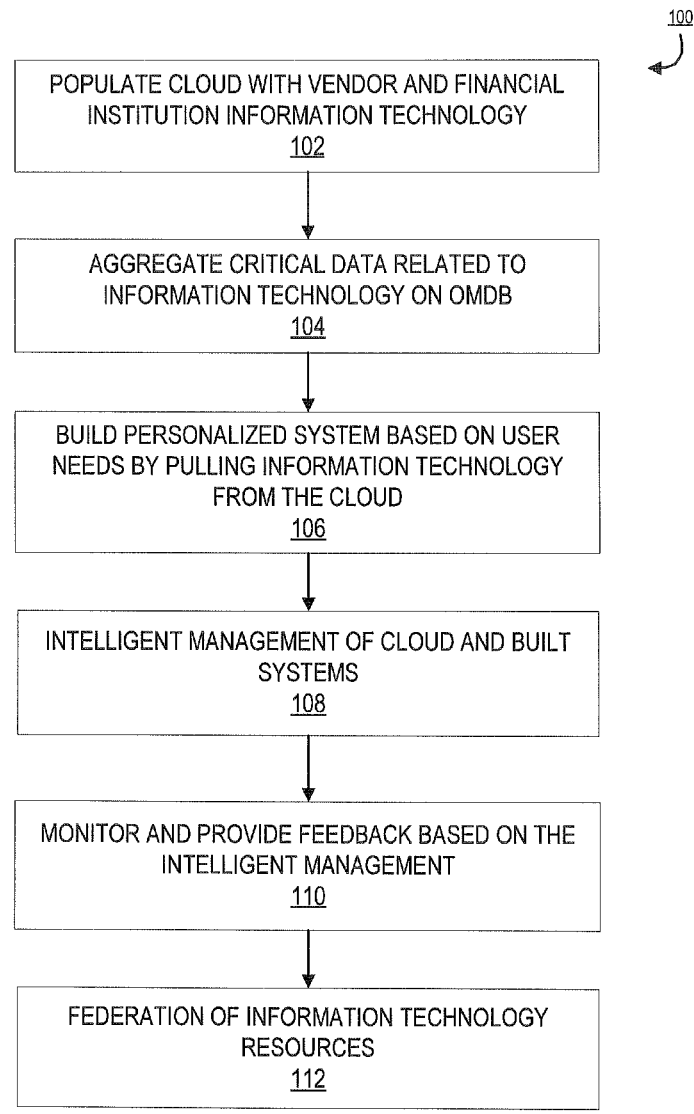
Figure 2:
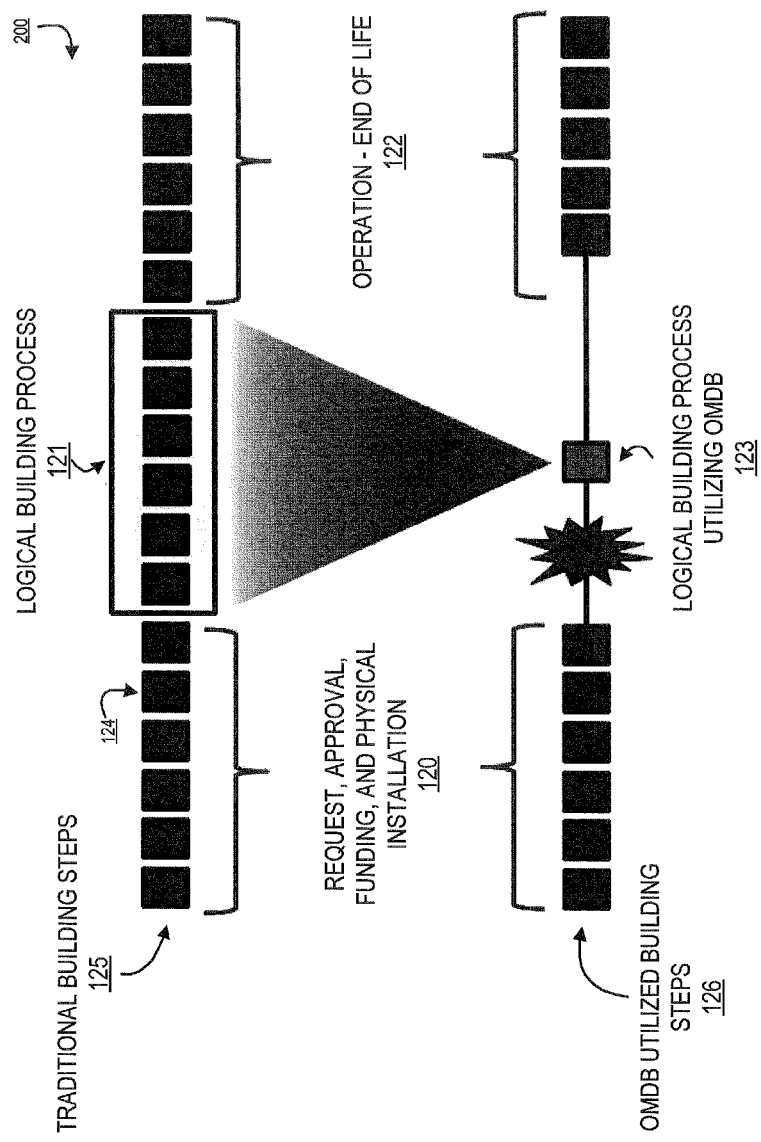
Figure 3:
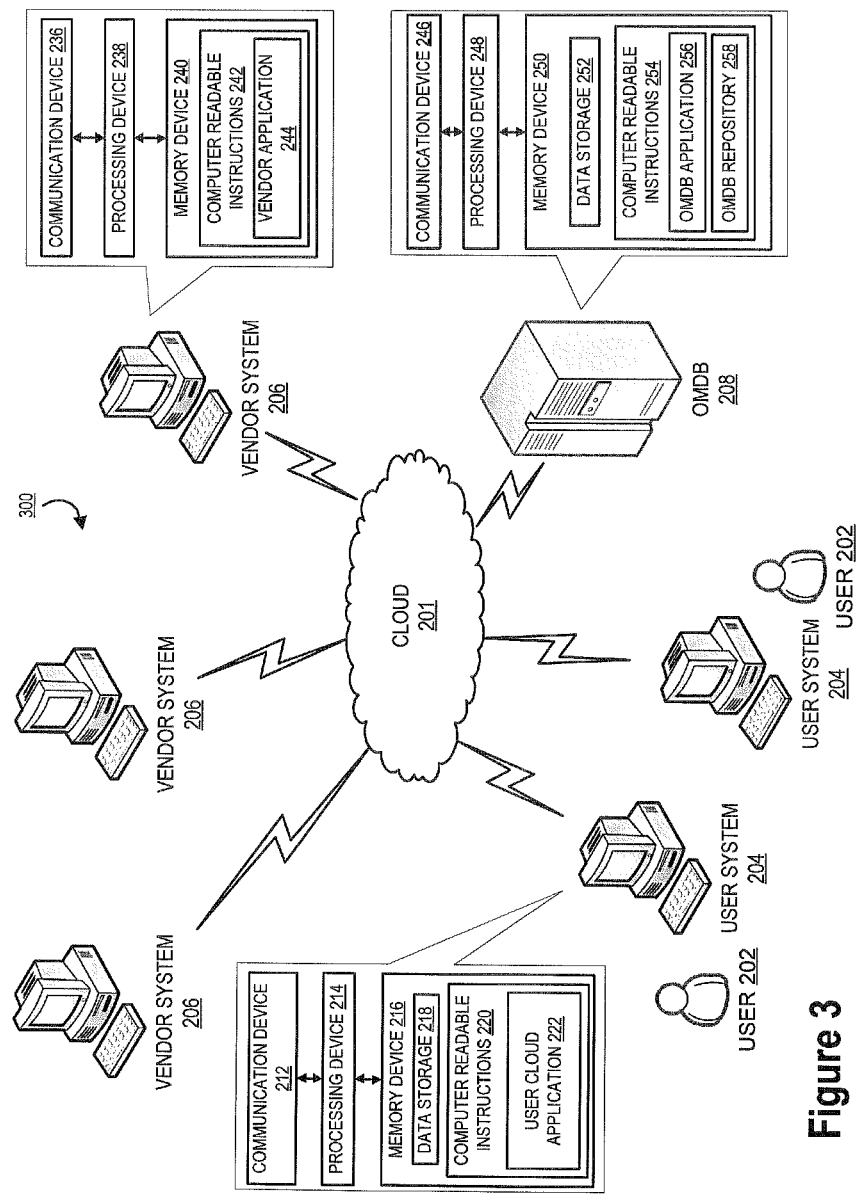
Figure 4:
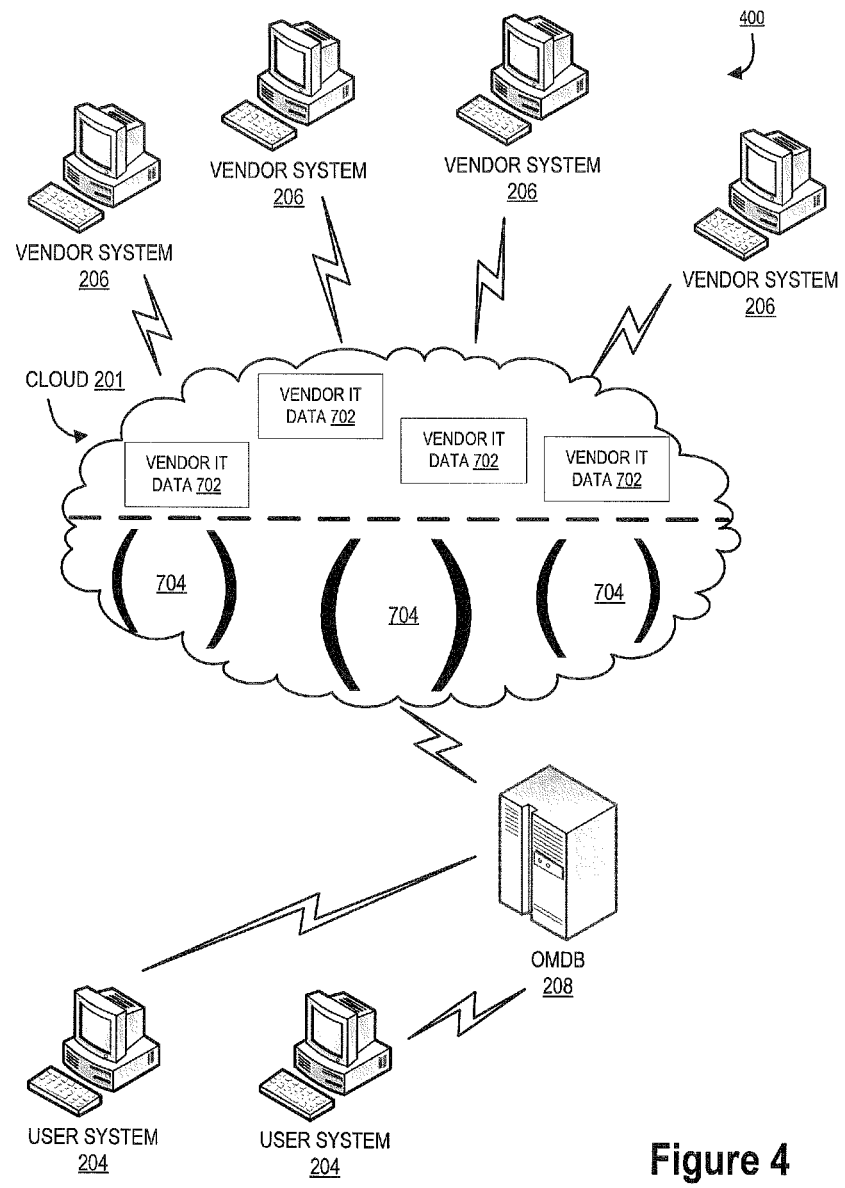
Figure 5:
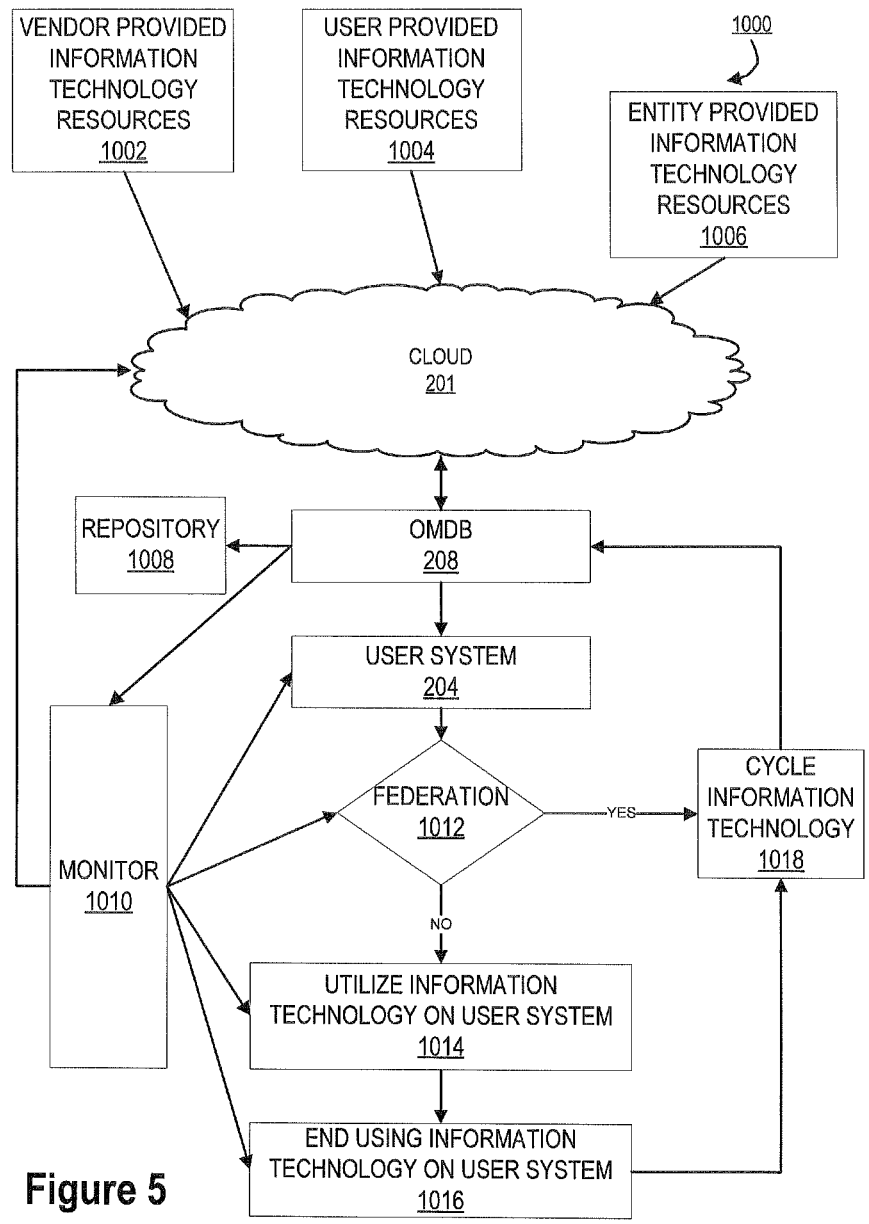
Figure 6:
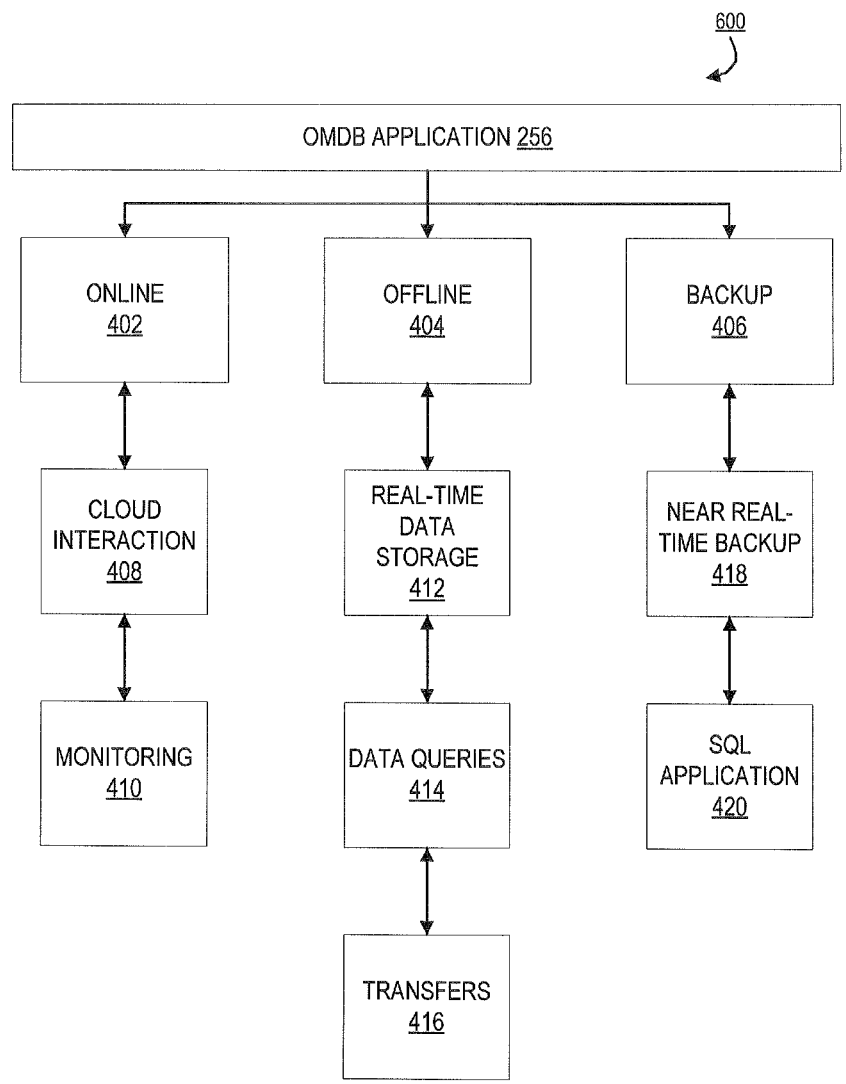
Figure 7:
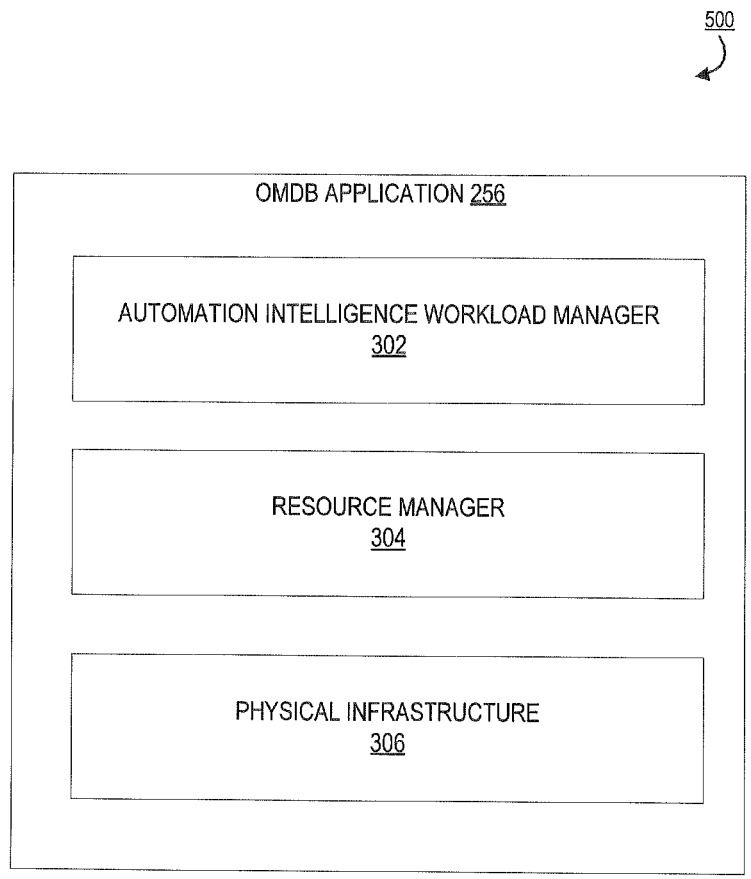
Figure 8:
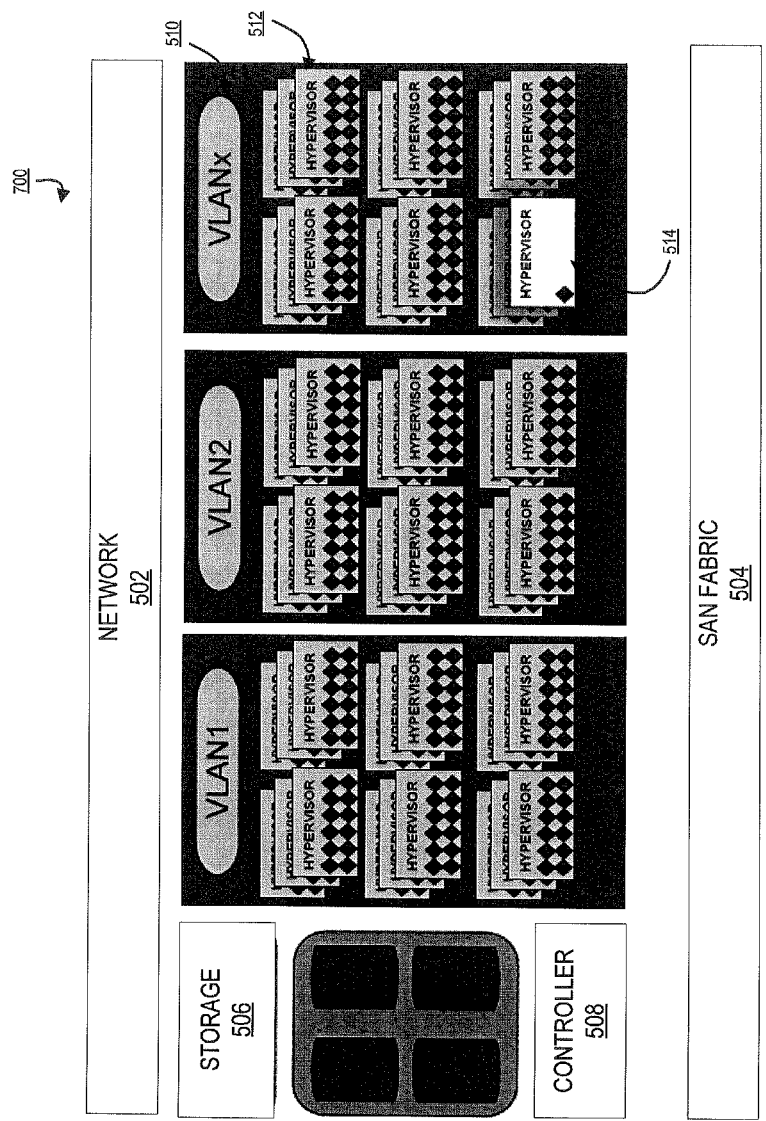
Figure 9:
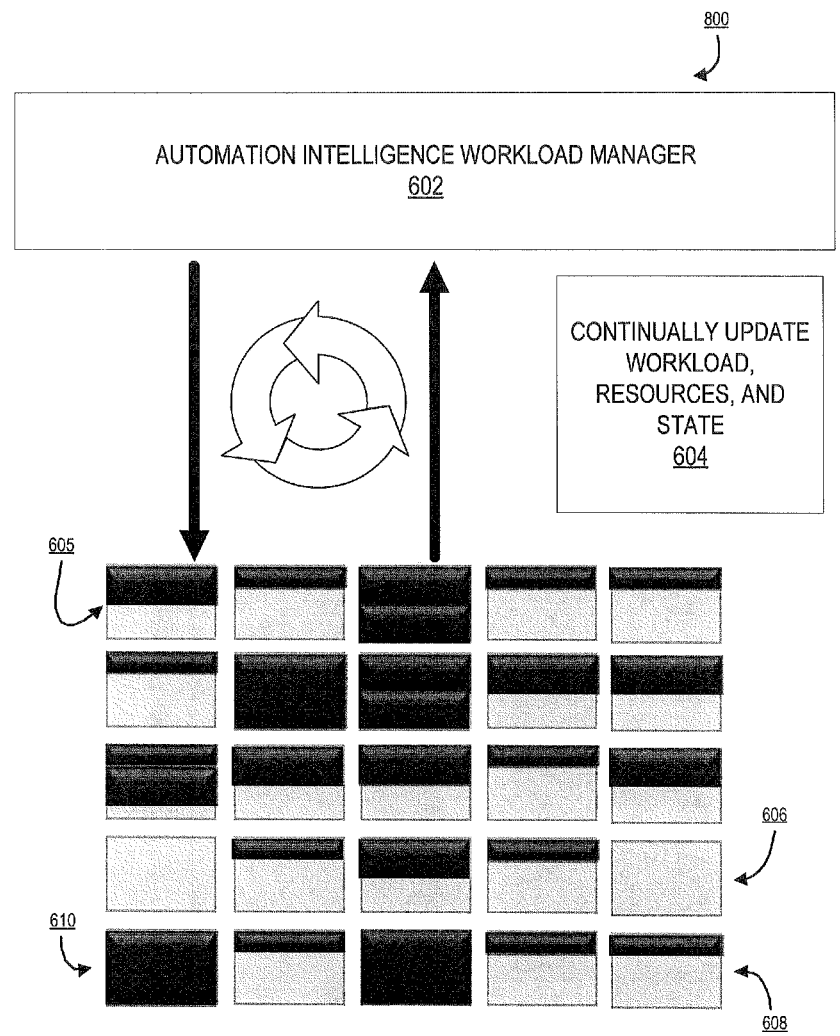
Figure 10:
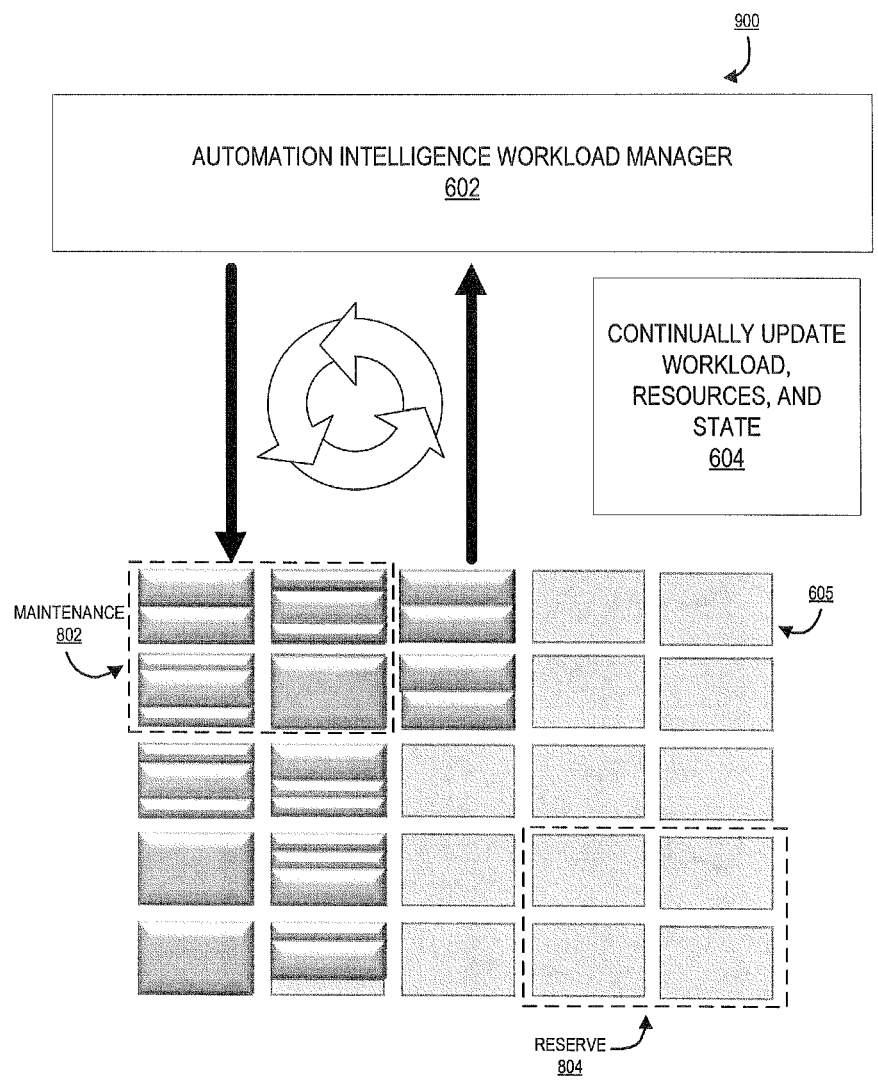
Figure 11:
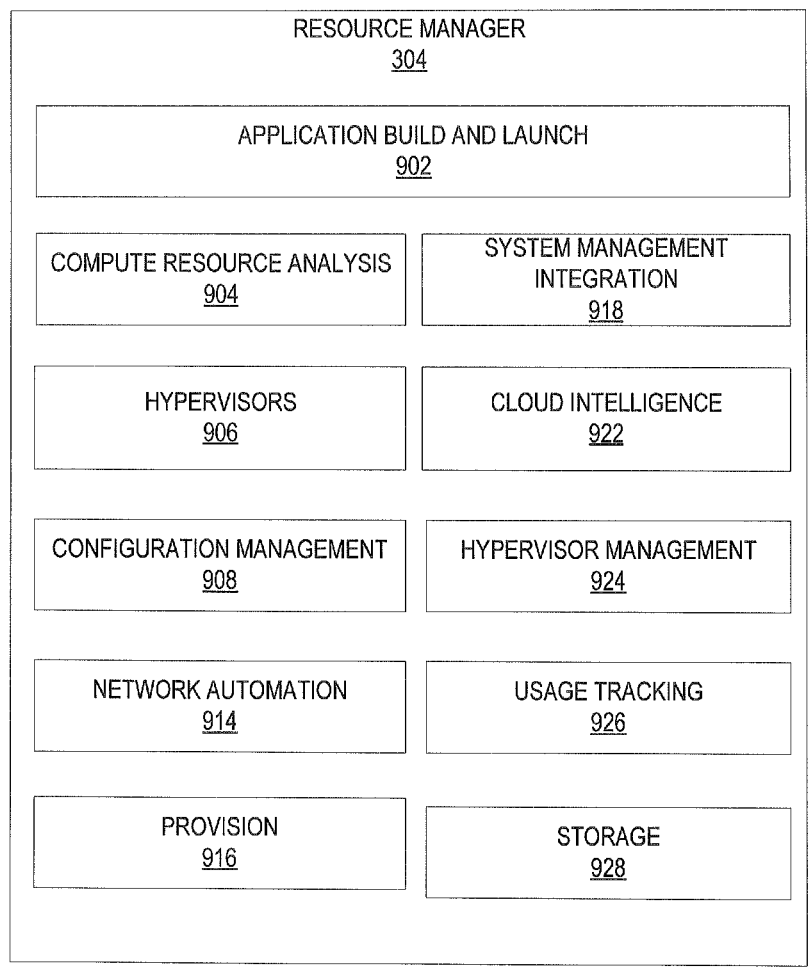

Having thus described embodiments of the invention in general terms, reference will now be made the accompanying drawings, wherein:

FIG. 1 provides a high level process flow illustrating the process of using the orchestration management database system, in accordance with embodiments of the invention;

FIG. 2 provides an illustration of the time requirements for building or updating information technology infrastructure components within an entity's information technology infrastructure using traditional methods and the orchestration management database (OMDB) system, in accordance with an embodiment of the invention;

FIG. 3 provides an OMDB cloud computing system environment, in accordance with various embodiments of the invention;

FIG. 4 provides an illustration of a deployment method of the OMDB cloud where data interaction on the cloud is directed through the OMDB system in accordance with an embodiment of the invention;

FIG. 5 illustrates information technology resources movement through the OMDB system, in accordance with embodiments of the invention;

FIG. 6 provides a process map illustrating the operational compartments of the OMDB, in accordance with an embodiment of the invention;

FIG. 7 illustrates the modular components of the OMDB system, in accordance with embodiments of the invention;

FIG. 8 provides an overview illustrating the intelligence workload manager monitoring systems within the information technology infrastructure network, in accordance with embodiments of the invention;

FIG. 9 illustrates the intelligent management of the OMDB monitoring hypervisors within the information technology infrastructure, in accordance with embodiments of the invention;

FIG. 10 illustrates the intelligent management of the OMDB monitoring hypervisors and determining federation within the information technology infrastructure, in accordance with embodiments of the invention; and FIG. 11 illustrates the modularization of the resource manager of the OMDB, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "information technology resources" as used herein includes any data or resources that may be needed for an entity to provide information technology infrastructure. For example, this data may include software, hardware, memory, storage, programs, operating systems, programming notes, instructions, output resulting from the use of any software program, including word processing documents, spreadsheets, database files, charts, graphs and outlines, electronic mail or "e-mail," personal digital assistant ("PDA") messages, instant messenger messages, source code of all types, programming languages, linkers and compilers, peripheral drives, PDF files, PRF files, batch files, ASCII files, crosswalks, code keys, pull down tables, logs, file layouts and any and all miscellaneous files or file fragments, deleted file or file fragment. Information technology resources may also include any and all items stored on computer memory or memories, hard disks, floppy disks, zip drives, CD-ROM discs, Bernoulli Boxes and their equivalents, magnetic tapes of all types and kinds, microfiche, punched cards, punched tape, computer chips (including but not limited to EPROM, PROM, ROM and RAM of any kind) on or in any other vehicle for digital data storage or transmittal, files, folder tabs, or containers and labels appended to or associated with any physical storage device associated with each original and each copy. In accordance with embodiments of the invention, the term "information technology infrastructure" as used herein refers to the totality of interconnecting hardware and software that supports the flow and processing of information. Information technology infrastructures include all information technology resources, physical components, and the like that make up the computing, internet communications, networking, transmission media, or the like of an entity.

Furthermore, embodiments of the present invention use the term "user." It will be appreciated by someone with ordinary skill in the art that the user may be an individual, financial institution, corporation, or other entity that may require electronic data, software, and/or hardware though an information technology infrastructure. Embodiments of the present invention also use the term "vendor" to describe a company, business, individual, or other entity that provides systems, software, hardware, and other technology required for operation of an entity.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of entities that have an information technology infrastructure.

FIG. 1 illustrates a high level process flow illustrating the process of using the orchestration management database system 100, in accordance with embodiments of the invention. As illustrated in block 102 of the high level process flow 100, the system populates the cloud with vendor and/or financial institution information technology. These technology may include any electronic data, hardware, software, systems, applications, programs, interfaces, packages, and the like that may be utilized by a user within an entity's information technology infrastructure. The technology may be received from vendors, users, various lines of business within a financial intuition, or the like. In some embodiments, the system may request the information technology resources from the vendor. In other embodiments, the vendor may provide the system with the information technology resources. In some embodiments, the technology data from a vendor may be provided to the system based on an agreement between the system managers and the vendor. Once the data has been received by the system, the system may distribute the technology data received from the vendor on the cloud.

As further illustrated in FIG. 1, once the cloud has been populated, the system may then aggregate the critical data related to information technology on to the orchestration management database, as illustrated in block 104. The critical data may include, but is not limited to, all vendor provided data or entity provided data located on the cloud. This data may include data such as information technology resources and/or any other data that may be utilized for an information technology infrastructure of an entity or the users of the information technology infrastructure. The aggregated critical data is then compartmentalized within the single usable database such that a dramatically simplification of the entity's ability to do core functions of information technology and provide integration with external vendors and components is achieved.

Next, as illustrated in block 106 the personalized system may be built using the information technology resources on the cloud. The personalized system may be built based on a user needs and the information technology resources on the cloud. For example, if a user needs a specific amount of memory, computer hardware, software, and the like for his/her work station, the system may provide and or activate those needs for the user via the cloud. Next, as illustrated in block 108, the system may provide intelligent management of the cloud and the systems built within the entity's information technology infrastructure. Intelligent management allows the system to be managed without user monitoring. The system may be able to monitor the vendors on the cloud, the use of the cloud, the use of all information technology resources on each of the user's devices, and the like without having to have an individual monitor the data.

As further illustrated in FIG. 1, the intelligent management of the system allows for monitoring and feedback for the system, as illustrated in block 110. In this way, if an individual wishes to receive feedback on inventory, capacity, performance, billing, mechanical sequences, next building processes, and the like, the individual does not have reach out to the user's workstation or individual server complexes to determine the information. The individual may be provided this feedback information from the system because this information is available within the OMDB.

Finally, as illustrated in block 112 the OMDB system provides for federation of information technology resources. Federation of information technology resources allows the OMDB system to push and/or pull information technology resources to/from the OMDB, cloud, user systems, and the like. In this way, if a component within the information technology infrastructure is not being utilized to its maximum capacity, the OMDB may be able to pull that data form the component and push it to another component that may utilize the data. For example, if a user system is provided with 4 GB of memory during the initial building of the user's system, but it is determined that the user's system only utilizes a peak of 1 GB of memory. The OMDB may notify other components which can re-allocate the memory resources on the user system more efficiently.

FIG. 2 illustrates the time requirements for building and/or updating information technology infrastructure components 200, such as new software and/or hardware, within an entity's information technology infrastructure using traditional methods and the orchestration management database system, in accordance with an embodiment of the invention. The traditional building steps 125 are illustrated in a linier fashion using time blocks 124. Each time block 124 measures a predetermined amount of time, such as a minute/hour/day or the like. The OMDB utilized building steps 126 is illustrated below the traditional building steps 125 and is also illustrated in a linier fashion using time blocks 124. Initially, the time for a user request, approval of that request, and physical instillation of hardware and the like, as illustrated in section 120, typically takes the same amount of time blocks 124 irrespective of using the traditional building steps 125 or the OMDB utilized building steps 126. However, the actual building process within the steps takes significantly less time, in the form of time blocks 124 utilizing the OMDB. As illustrated in block 121 the logical building process for the traditional building steps 125 takes six time blocks 124. However, utilizing the OMDB the logical building process 123 takes one time block 124. This is because of the OMDB can modularize all critical data necessary for information technology infrastructure deployment and provide other components the capability of touch less deployment to quickly build the information technology component with minimal to no human involvement in the building process. As such, the OMDB reduces the logical building process and has the ability to centrally store all information technology resources that is critical to the component build. Following the building process 121, 123 the user's system may be completely installed and operational 122 until the end of life for that particular component of the user's system.

FIG. 3 illustrates an orchestration management database (OMDB) cloud computing system environment 300, in accordance with one embodiment of the present invention. As illustrated in FIG. 3, the OMDB 208 is operatively coupled, via a cloud network 201 to the user systems 204 and to vendor systems 206. In this way, the OMDB 208 can send information to and receive information from a user system 204 and a vendor system 206. FIG. 3 illustrates only one example of an embodiment of an OMDB cloud computing system environment 200, and it will be appreciated that in other embodiments one or more of the systems, devices, or servers may be combined into a single system, device, or server, or be made up of multiple systems, devices, or servers.

The cloud 201 may allow for on-demand network access to a shared pool of configurable resources provided by the OMDB 208, user system 204, or the vendor systems 206. These resources may include but are not limited to information technology resources such as hardware, software, networks, servers, storage, services, applications, systems, programs, packages, or the like and updates or programs to operate the same. The OMDB allows for these information technology resources to be rapidly provisioned and released within the modular system. The network access may be a global area network (GAN), such as the Internet, a wide area network (WAN), a local area network (LAN), or any other type of network or combination of networks. The network may provide for wireline, wireless, or a combination wireline and wireless communication between devices on the network.

In some embodiments, information technology resources may be stored on the cloud 201 and not at a local computing device, such that the memory of the local computing device is not affected by the work associated with the resources on the cloud 201. Furthermore, the cloud 201 may provide processing capabilities, such that the user may run the information technology resources on the cloud 201 and not on his/her local computing device. In this way, a shared pool of information technology resources may be accessed, processed, and stored by users of the OMDB cloud computing system 300 all within the cloud 201. In some embodiments, the OMDB 208 may modularly store the information technology resources that may be accessible via the cloud 201. In this way, the data and associated resources may be stored on the OMDB 208 and not on the cloud 201.

The cloud 201, in some embodiments, may take the form of several different service and/or deployment models as required by the managing entity of the cloud 201. The service models include, but are not limited to cloud software as a service, cloud application as a service, cloud platform as a service, and count infrastructure as a service. Cloud software as a service model provides the user 202 with the ability to run programs and applications on the cloud infrastructure as opposed to the user system 204. Cloud application as a service is similar to cloud software as a service, but in this model the user 202 is able to specify and save customer server configurations and application templates. Cloud platform as a service allows a user 202 to be able to deploy onto the cloud user-created or acquired applications and programs. Cloud infrastructure as a service allows a user 202 to control portions of the cloud's operating systems, deployment applications, storage, networking, and other fundamental computing resources of the cloud 201.

The deployment models may include, but are not limited to private model, public model, community model, and hybrid model. In some embodiments, the cloud 201 may be provided in a private model. The private model allows the cloud 201 to only be used only be a single entity. In some embodiments, the cloud 201 may be provided in a public model. The public model allows the cloud 201 to be available to the public or to multiple entities. In some embodiments, the cloud 201 may be provided in a community model. The community model allows the cloud to be accessed and/or used by a group of related entities. In some embodiments, the cloud 201 may be provided in a hybrid model. In the hybrid model the cloud 201 may be used both publicly and privately based on the provider's requests.

The various service and/or deployment models of the cloud 201 may each be utilized for the cloud 201 associated with the OMDB system environment 300. However, some models may require more monitoring than others. For example, in the public deployment model, a larger number of users may access the cloud 201 and therefore there is more likely going to be a security issue, simply based on the number of individuals who have access to the cloud 201 and the data or applications located on the cloud 201. In some embodiments, a private cloud 201 may provide the most security protection to the financial institution and other users of the cloud 201.

In some embodiments, the user 202 is an individual. The individual may be an associate and/or other employee within a financial institution. In other embodiments, the user 202 may be a financial institution, government organization, corporation, or other entity with an information technology infrastructure. The user 202 may wish to retrieve vendor provided information technology resources off of the cloud 201 for use on his/her user system 204. In some embodiments, the user 202 may be provided with information technology resources from the cloud 201 via the OMDB 208. In the example illustrated in FIG. 3, there are two users 202 accessing the cloud 201 through their user systems 204, although one of ordinary skill in the art may appreciate that any number of users 202 may be accessing the cloud through any number of user systems 204.

As illustrated in FIG. 3, the OMDB 208 generally comprises a communication device 246, a processing device 248, and a memory device 250. As used herein, the term "processing device" generally includes circuitry used for implementing the communication and/or logic functions of the particular system. For example, a processing device 248 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the cloud 201 and other devices associated with the cloud 201, such as, but not limited to the user systems 204 and the vendor systems 206. As such, the communication device 246 generally comprises a modem, server, or other device for communicating with the cloud 201 and other devices associated with the cloud 201.

As further illustrated in FIG. 3, the OMDB 208 comprises computer-readable instructions 254 stored in the memory device 250, which in one embodiment includes the computer-readable instructions 254 of an OMDB application 256 and/or a OMDB repository 258 In some embodiments, the memory device 250 includes data storage 252 for storing data related to the financial institution and the management of the cloud 201 including but not limited to data created and/or used by the OMDB application 256.

As described in more detail below, the OMDB 208 may provide for the management of the OMDB cloud computing system 300, as well as the deployment, monitoring, storing, and federation of information technology resources within the information technology infrastructure.

In the embodiment illustrated in FIG. 3 and described throughout much of this specification, the OMDB application 256 manages the information technology infrastructure and activity on the cloud 201. The OMDB application 256 provides managerial applications for vendors, users 202, and entity providing the cloud 201.

The OMDB application 256 allows for vendors to provide information technology resources to the cloud 201, organizes the vendor's data on the cloud 201, allows for vendors to update data, allow for compatibility of vendor's data with user systems 204, enables the vendor to monitor its data on the cloud, and the like.

The OMDB application 256 allows for the user 202 to access the cloud 201, select programs or applications on the cloud 201, use the vendor information technology resources, store preferences, or the like. The OMDB application 256 allows the entity providing the cloud 201 the capability of managing the cloud 201 such as the deployment, monitoring, and federation of information technology resources on the cloud 201 within the information technology infrastructure.

The OMDB application 256, in some embodiments, allows a vendor to provide information technology resources to the cloud 201. In this way, the vendor may seek out and request from the OMDB application 256 for the vendor's data to be added to the cloud 201. In other embodiments, the OMDB application 256 may seek out vendors and request the vendor add data to the cloud 201. In still other embodiments, a vendor may provide the cloud 201 with data independent of any action by the OMDB 208 or the OMDB application 256. In this way, the vendor may have several avenues to provide the cloud 201 with information technology resources and other resources that the particular vendor may provide for the entity's information technology infrastructure.

Once the vendor has provided its information technology to the cloud 201 the OMDB application 256 may modularly separate the vendor data. The vendor data, comprising several individual programs, applications, software, or the like from a vendor, may be distributed on the cloud 201 and stored in the OMDB 208 within the OMDB repository 258 in close to real time in a modular aggregated means. In this way, the OMDB application 256 separates the vendor information technology resources such that it may be easily deployable when building an information technology component.

Next the OMDB application 256 provides the vendor with the ability to access the cloud 201 in order to update the vendor's information technology on the cloud 201. If the vendor develops new resources, such as updated software, applications, packages, programs, or the like, the OMDB application 256 allows a vendor to update the information technology resources that the entity has on the cloud 201. In this way, the OMDB application 256 allows for, in some embodiments, an open architecture environment for the vendors to have the ability to install update, fix bugs, implement new versions, or the like of the vendor resources. In some embodiments, the vendor may automatically update the vendor's data on the cloud 201 by accessing the cloud 201 via a vendor system 206. In other embodiments, the OMDB application 256 may request the vendor update its data on the cloud 201. In this way, the vendor, either through the vendor system 206 or other means may update the information technology resources that the vendor has on the cloud 201, such that users 202 may have access to the latest versions of the vendor's data.

The OMDB application 256 may also allow a user 202, through a user system 204 to compatibly access the cloud 201 and the vendor information technology resources on the cloud 201. In this way, the user 202 may have access to the information technology available to that entity. For example, a user 202 may require a specific program to open a document or perform his/her tasks. As such, the user 202 using the user system 204 may be able to access the cloud 201 through to OMDB 208 to determine if the program is available within the information technology infrastructure of the entity. If the user 202 determines that the program is available, he/she may request the program be built into his/her user system 204.

If the user 202 is authorized to have the vendor information technology resources built into his/her user system 204 the user 202 may receive the information technology resources via the OMDB 208 in real-time or near real-time.

Furthermore, information related to the user system 204, such as a user's 202 preferences with respect to information technology may also be stored within the OMDB application 256. In this way, the OMDB application 256 may monitor the user's 202 preferences as well as the status of each of the information technology components provided to the user system 204. This aids the OMDB application 256 in the federation of information technology resources to and from the user system 204 based on the user's 202 preferences and use of the information technology on the user system 204.

The OMDB application 256 also allows the entity providing the cloud 201 the capability of managing the cloud 201 such as the deployment, monitoring, and federation of information technology resources on the cloud 201. In some embodiments, the OMDB application 256 modularizes the information technology resources on the cloud 201 such that the data may be easily provided in a checklist, deployed, and monitored. In this way, OMDB application 256 is capable of handling the dynamic rate of data change that occurs in an entity information technology environment and is able to connect all of the components together as an intersection point of data. This provides an aggregate module location of all information. Therefore, the OMDB application 256 may store the data structure that may define the information technology data required for building information technology components and/or systems. The resource managers in the cloud environment may, in some embodiments, may allow for collecting data necessary to build and communicate with the OMDB to store a dynamic list of all the information technology resources that is required for building one or more information technology components and/or systems. In this way, the OMDB application 256 may know exactly how much of each information technology resources are required for building. For example, a server may be being built, because of the OMDB application 256 dynamic list, the OMDB application 256 may know prior to starting the build, whether the information technology infrastructure may need the new server and/or if the information technology infrastructure has the capacity to accept the new server. Furthermore, the dynamic list may also aid in determining the information technology resources that the server may need that is either available via the cloud 201 or that may need to be purchased from an outside vendor.

In some embodiments, the OMDB application 256 provides for touch less deployment of information technology infrastructure data and/or components. In this way, instead of taking several information technology professionals several days/weeks/months to set up and build information technology infrastructure components and/or systems, such as a new server, operating system, user workstation, or the like the OMDB application 256 is able to work with other resource managers to provide the critical processes in the proper step-by-step fashion in order to deploy that information technology resources or information technology infrastructure components required for the building process within minutes and without having to utilize information technology professionals. Because the OMDB application 256 has the capabilities to monitor the cloud 201 and the information technology resources located on the cloud 201 and throughout the information technology infrastructure, the OMDB application 256 may quickly obtain all information technology required for deployment of a new build or the like. This significantly shortens the amount of time required to determine if the appropriate information technology resources are available, obtaining the information technology, and building based off of the information technology resources. As such, by utilizing the cloud 201 in conjunction with the OMDB application 256 all critical information technology resources are quickly accessible and implementable onto a newly deployed information technology infrastructure component.

In some embodiments, the OMDB application 256 is capable of intelligent management of the information technology infrastructure, including the cloud 201 and any system associated with the cloud 201 including but not limited to user systems 204 and/or vendor systems 206. Intelligent management includes monitoring, providing feedback for the information technology infrastructure, the cloud 201, and the OMDB application 256, as well as aiding in federation of information technology resources. Furthermore, the management ensures the proper building of information technology infrastructure components using information technology resources.

The intelligent management of the OMDB application 256 allows for monitoring of the information technology infrastructure, including the cloud 201 and any system associated with the cloud 201 including but not limited to user systems 204 and/or vendor systems 206. The OMDB application 256 monitors every information technology infrastructure component and/or system being built, the information technology resources used for the builds, the data on the cloud 201, the OMDB repository 258, the inventory available, capacity available, performance, billing, building sequences, or the like that may be necessary to build and/or operate an information technology infrastructure for an entity. The monitoring may ensure that all necessary aspects for a build, maintenance, federation, or the like are available within the infrastructure, in order to maintain a properly functioning information technology infrastructure within an entity.

The intelligent management of the OMDB application 256 allows for providing feedback relating to the information technology infrastructure, including the cloud 201 and any system associated with the cloud 201 including but not limited to user systems 204 and/or vendor systems 206. The feedback allows a user 202 of the information technology infrastructure to request and/or obtain in near real-time feedback related to the information technology infrastructure. For example, a user 202 may request feedback related to the capacity available on a user system 204, a line-of-business set of systems, or an entire entity's system. Therefore, a user 202 may be able to receive feedback based on the monitoring of either a single information technology resources, a single component within the information technology infrastructure, and/or the entire information technology infrastructure. In some embodiments, the feedback may be provided to a user 202 based on a user 202 recommendation of feedback. In other embodiments, the OMDB application 256 may automatically provide feedback to a user 202 based on an event occurring within the information technology infrastructure. For example, if it is determined that a specific individual user 202 is to be notified each time a new system and/or component within the information technology infrastructure is being built, the OMDB application 256 may recognize this requirement and notify the proper user 202.

The intelligent management of the OMDB application 256 allows for proper building of information technology infrastructure components and/or systems that use information technology resources. Utilizing the deployment capabilities of the OMDB application 256, the OMDB application 256 is capable of working with other components in the cloud environment to ensure that all build steps are completed. The sequence and order of build steps is modeled in the workflows of the vendor system 206. The final disposition of all building steps is stored in the OMDB application 256 and is used to notify the user system 204 of success of failure of the build. This way, the OMDB application 256 allows for seamless touch less building of information technology infrastructure components and/or systems.

The OMDB application 256 allows for a cycling algorithm that ensures the information technology resources selected to be implemented during federation and/or building of an information technology component and/or system may not need to be recalled for a prior implementation. For example, if a new IP address is required for a new information technology infrastructure system, the OMDB application 256 may have several IP address available for deployment from the cloud 201 or the OMDB repository 258. However, the OMDB application 256 may have to select an appropriate IP address for that particular system. In some cases the IP address may correspond to a line of business, office location of the entity, or the like. In other cases, the IP address may have recently been closed and therefore it may be likely that the IP address may be required to be re-opened. The cycling algorithm ensures that the proper information technology resources, in this example, IP address, is being utilized during the build. The cycling algorithm of the OMDB application 256 prevents information technology resources from being selected for new building until after the OMDB application 256 has ensured that the information technology resources will not be needed for a previous function. For example, if that IP address was closed by accident, the information technology system that previously had the IP address may be able to retrieve and revive the address for that prior system. This cycling algorithm ensures that the information technology resources selected to be implemented during a build of an information technology component may not be recalled for a prior implementation.

In some embodiments, the OMDB application 256 provides for the federation of information technology resources. Federation of information technology resources allows the OMDB application 256 to push and/or pull information technology resources to/from the OMDB 208, the cloud 201, user systems 204, and the like. In this way, if a component within the information technology infrastructure is not utilizing all information technology resources provided to it, the OMDB may be able to pull that data from the component and push it to another component that may utilize the data. For example, if a user system 204 is provided with 4 GB of memory, however monitoring shows that that user system only ever utilizes 1 GB of memory. The OMDB application 256 may notify other components, such as those associated with the network 201, which can re-allocate the memory resources on the user system more efficiently. Furthermore, the federation aspect of the OMDB application 256 allows the system to communicate with external systems when information technology resources are required from the external system for building an information technology component within the information technology infrastructure.

In the embodiment illustrated in FIG. 3 and described throughout much of this specification, the OMDB repository 258 provides a storage repository for the critical data associated with the cloud 201, critical data associated with the information technology infrastructure, data lists, and the like. The OMDB repository 258 is capable of storing these data in real-time or near thereto, such that, if necessary, the information technology infrastructure can be accessed through the OMDB repository 258.

The OMDB repository 258 may also allow for storage of the vendor information technology resources. In some embodiments the vendor information technology may be stored on the cloud 201. In some embodiments, the vendor information technology may be stored in the OMDB repository 258. In yet other embodiments, the vendor information technology may be stored on the user system 204. Along with the vendor information technology, the OMDB repository 258 may also store applicable software for data compatibility and the like.

The OMDB repository 258 also allows for storage of each of the user system 204 preferences, user system 204 usage, and information technology components on the cloud 201. In this way, user 202 information associated with his/her information technology resources usage, components, and the like may be stored within the OMDB repository 258. In this way, the user's use of data associated with the information technology infrastructure as a whole may be monitored in order to better provide information technology aid to the user 202 as well as provide for federation of information technology resources if necessary.

FIG. 3 further illustrates a vendor system 206 generally comprises a communication device 236, a processing device 238, and a memory device 240. The processing device 214 is operatively coupled to the communication device 236 and the memory device 216. The processing device 238 uses the communication device 236 to communicate with the cloud 201 and other devices connected to the cloud 201, such as, but not limited to the OMDB 208 and the user systems 204. As such, the communication device 236 generally comprises a modem, server, or other device for communicating with the cloud 201 and the other devices on the cloud 201.

As further illustrated in FIG. 3, the vendor system 206 comprises computer-readable instructions 242 stored in the memory device 240, which in one embodiment includes the computer-readable instructions 242 of a vendor application 244. In this way, in some embodiments, a vendor may be able to provide information technology resources to the cloud 201, organize their information technology resources on the cloud 201, update their information technology resources on the cloud 201, and the like using the vendor application 244. In some embodiments, the memory device 240 includes data storage for storing data related to the vendor system 206 including but not limited to data created and/or used by the vendor application 244.

The vendor application 244 allows a vendor to provide information technology resources, such as software, programs, and the like to an entity. The entity may then, in some embodiments, place the vendor provided information technology resources on to the cloud 201. In other embodiments, the vendor may be able to place information technology resources onto the cloud 201 directly via the vendor system 206. In this way, the vendor may be able to populate the cloud 201 with any information technology the vendor may distribute by using any vendor system 206.

The vendor application 244 further allows the vendor to access the cloud 201 to update and monitor the vendor's information technology resources on the cloud 201. In this way the vendor, through the use of the vendor system 206 may access the cloud 201 such that the vendor may provide the latest updates to the information technology resources that the vendor may have previously provided to the cloud 201. In this way, the information technology infrastructure of the entity may be able to provide the user 202 with access to the most updated version of the vendor's information technology resources. Furthermore, the host of the cloud 201 may not have to provide the updates to the vendor information technology on the cloud 201, the vendor may be able to access the cloud 201 and independently provide updates to the vendor's data on the cloud 201.

FIG. 3 depicts only three vendor system 206 within the OMDB cloud computing system environment 300, however, one of ordinary skill in the art will appreciate that a plurality of vendor systems 206 may be communicably linked with the cloud 201 and the other devices on connected to the cloud 201, such that each vendor who may wish to provide information technology resources to the cloud 201 is able to do so and is communicably linked to the cloud 201 and the other devices on the cloud 201.

FIG. 3 also illustrates a user system 204. The user system 204 generally comprises a communication device 212, a processing device 214, and a memory device 216. The processing device 214 is operatively coupled to the communication device 212 and the memory device 216. The processing device 214 uses the communication device 212 to communicate with the cloud 201 and other devices, such as, but not limited to the OMDB 208 and the vendor systems 206. As such, the communication device 212 generally comprises a modem, server, or other device for communicating with the cloud 201 and the other devices connected to the cloud 201.

As further illustrated in FIG. 3, the user system 204 comprises computer-readable instructions 220 stored in the memory device 216, which in one embodiment includes the computer-readable instructions 220 of a user cloud application 222. In this way, in some embodiments, the user cloud application 222 may allow the OMDB 208 access to the information technology resources associated with the user system 204 for monitoring, building, and/or federation of data. Furthermore, the user cloud application 222 may allow a user 202 to access the cloud 201, use the vendor information technology resources on the cloud 201, and/or the like. In some embodiments, the user cloud application 222 allows a user 202 to utilize the vendor information technology resources via the processing device 214 of the user system 204. In some embodiments, the user 202 may utilize the cloud's processing capabilities to run vendor information technology resources.

In some embodiments, the memory device 216 includes data storage 218 for storing data related to the user system 204 including but not limited to data created and/or used by the user cloud application 222. A "user system" 204 may be any communication device, including mobile devices, personal digital assistant (PDA), a mobile Internet accessing device, or other user system including, but not limited to PDAs, pagers, televisions, gaming devices, laptop computers, desktop computers, cameras, video recorders, audio/video player, radio, GPS devices, other information technology infrastructure components such as, servers, tablets, interfaces, or the like, or any combination of the aforementioned, or the like.

FIG. 3 depicts only two user systems 204 within the OMDB system environment 300, however, one of ordinary skill in the art will appreciate that a plurality of user systems 204 may be communicably linked with the cloud 201 and the other devices on connected to the cloud 201, such that each user 202 who is associated with the information technology infrastructure may be associated with the cloud 201 and, as such, is communicably linked to the cloud 201 and the other devices on the cloud 201.

It is understood that the servers, systems, and devices described herein illustrate one embodiment of the invention. It is further understood that one or more of the servers, systems, and devices can be combined in other embodiments and still function in the same or similar way as the embodiments described herein.

Since cloud computing technology is relatively new, there is some risk associated with its adoption. The primary risk is that the cloud 201 does not provide adequate security safeguards. This is due to the amount of users 202 and other potential third parties that may be able to access the cloud 201. Additional risks may include immaturity of resources on the cloud 201, a lack of auditing capability, and/or the like. In order to better provide adequate security safeguards, in some embodiments, the cloud 201 is provided such that the OMDB 208 facilitates any communications from user systems 204 to the cloud 201, as illustrated in FIG. 4.

FIG. 4 illustrates a model of deployment of the orchestration management database cloud 400 where data interaction on the cloud 201 is directed through the orchestration management database, in accordance with an embodiment of the invention. In this deployment model the vendor systems 206 may still provide vendor information technology resources 702 to the cloud 201. In this way, the information technology resources that is requested from the vendor by the entity for the entity's information technology infrastructure may be placed on the cloud 201. The vendor may, through the vendor system 206 provide the vendor information technology resources 702 to the cloud 201 in several ways. In some embodiments, the vendor may, through the vendor system 206 provide the vendor information technology resources 702 to the cloud 201 upon request from the entity. In this way, the entity may request the vendor information technology resources 702 from various vendors because the information technology infrastructure and some component or system thereof may require the information technology resources that a particular vendor may provide. In some embodiments, the vendor may, through the vendor system 206 provide the vendor information technology resources 702 to the cloud 201 independent of the entity requesting the vendor information technology resources 702.

Once the vendor information technology resources 702 is on the cloud 201, the OMDB 208 may act as an intermediary between user systems 204 within the information technology infrastructure. In this way, the individual user systems 204 may not have direct contact with either vendor systems 206 and/or vendor information technology resources 702. In this way, the user systems 204 and the entity's entire information technology infrastructure may be protected from potential threats, such as viruses, malware, and the like, that may be associated with the vendor information technology resources 702.

Furthermore, the OMDB 208 may set up portals 704 within the cloud 201 that are associated with different user systems 204, line of business, entity locations, criticalness of the data, and/or the like. Portals, in some embodiments, are based on the proximity and locality requirements a user 202 may have for a technology infrastructure system. In this way, the OMDB 208 may modularize portals 704 depending on the information technology resources such that the OMDB 208 may quickly access the portal 704 associated with a specific user system 204 or the like.

In this way, the OMDB 208 may be able to monitor, build, push-pull, communicate between the information technology infrastructure and the cloud 201, and provide feedback for the information technology infrastructure based on the OMDB 208 being an intermediary between the information technology infrastructure and the cloud 201. Furthermore, the OMDB 208 is capable of handling the dynamic rate of data change that occurs in an the technology infrastructure environment and is able to connect all of the pieces of the information technology infrastructure to the cloud 201 such that the OMDB 208 may act as an intersection between the information technology infrastructure and the cloud 201. However, even with all of the data passing through the OMDB 208, the OMDB 208 is capable of handling this amount of data and still able to perform the monitoring, building, federation, and the like functions within the information technology infrastructure.

FIG. 5 illustrates information technology resources movement through the orchestration management database system 1000, in accordance with embodiments of the present invention. Information technology resources, whether programs, applications, software, and/or the like that is utilized to build an information technology infrastructure may be received through various means. In some embodiments, the information technology resources may be vendor provided information technology resources 1002. In some embodiments, the information technology resources may be user provided information technology resources 1004. In other embodiments, the information technology resources may be entity provided information technology resources 1006. In yet other embodiments the information technology resources populating the cloud 201 and/or the information technology infrastructure may come from one or more of a vendor, user 202, or entity.

Once the information technology resources are received the cloud 201 is populated with the data. The cloud 201 may have all the information technology resources associated with the information technology infrastructure such that vendors may be able to provide updates to their data and user systems may be implemented with information technology resources in near to real-time by simply pushing the data from the cloud 201 to the user system 204. The data on the cloud 201, access to the cloud 201, and other aspects of the cloud 201 may be monitored by the OMDB 208 via the OMDB monitoring functionality 1010.

The OMDB 208 modularly manages the cloud 201. As such, the cloud 201 may be accessed by the OMDB 208 and the OMDB 208 may direct information technology from the cloud 201 to the various user systems 204. The OMDB 208 also provides a repository 1008 and monitoring 1010 functionality for the cloud 201 and the rest of the information technology infrastructure. The repository 1008 may store all the information technology resources associated with the information technology infrastructure including the location of information technology resources, lists of critical components, lists of builds, and the like. This information may, in some embodiments be pushed from the OMDB 208 in real-time or close thereto. In other embodiments, this information may be pulled from the OMDB 208 by the repository 1008 in real-time or close thereto.

The OMDB 208 may provide monitoring 1010 functionality for the information technology infrastructure. As such, the OMDB 208 may monitor 1010 the information technology resources on the cloud 201, the user system 204, in the federation process 1012, when the information technology is being utilized 1014, and/or when the information technology has stopped being used by system of the information technology infrastructure 1016. In this way, the OMDB 208 may be able to monitor 1010 the information technology resources no matter what point the data is within the information technology infrastructure. This allows the OMDB 208 to may determinations as to the best ways to optimize the information technology resources usage within the information technology infrastructure.

As illustrated in FIG. 5, once the OMDB 208 determines the location of information technology resources from the cloud 201, the information technology resources may be pushed to the user system 204 that the OMDB 208 determines may utilize the information technology. Once the OMDB 208 pushes the information technology resources to the user system 204, the user 202 of the user system 204 may be able to utilize the information technology resources instantaneously or close thereto.

In some embodiments, the OMDB 208 may determine in decision block 1012 to federate the information technology resources on the user system 204. Federation of data may include the pushing and/or pulling of data to/from the user system 204 based on the OMDB 208 determination of where the information technology resources may be best utilized. If it is determined that information technology resources form the user system 204 is to be federated to another system, in block 1012, the information technology resources may be removed from the user system 204 and brought back to the OMDB 208.

In some embodiments, the addition of or subtraction of information technology resources to and/or from a user system 204, component, or other system of the information technology infrastructure may be done smoothly, such that the user 202 of the system may not be disturbed from his/her utilization of the system. In this way, the OMDB 208 may be able to move unused information technology resources from the user system 204 quickly without affecting the work flow of the user 202. For example, if the user system 204 is provided with 4 GB of memory initial from the OMDB 208. However, monitoring 1010 from the OMDB 208 shows that that user system 204 is only utilizing 1 GB of memory. The OMDB 208 may notify other components which can reallocate the memory resources on the user system more efficiently. This may allow the OMDB 208 to strategically manage the information technology infrastructure in a way that optimizes both the entity's information technology systems but also cost related to the information technology implemented throughout the entity.

As further illustrated in FIG. 5, if the OMDB 208 determines that no federation of information technology resources are needed at that time for the information technology resources that is associated with the user system 204, the information technology resources may be utilized by the user 202 of the user system 204, as illustrated in block 1014. Furthermore, the OMDB 208 may continually monitor 1010 the information technology resources as it is being used on the user system 204.

Once the information technology resources has been used, the OMDB 208 may determine that the information technology resources has reached the end of its life on the user system 204, as illustrated in block 1016. This may be determined by the OMDB 208 via the OMDB 208 monitoring 1010. The information technology resources may then be cycled back up to the OMDB 208 and the cloud 201 as illustrated in block 1018. This cycling may utilize a cycling algorithm to ensure that the data does not need to be re-utilized by the previous user system 204 prior to the OMDB 208 implementing the information technology resources into building a new system. The cycling information technology 1018 is also used when data is federated from a user system 204. The cycling again, ensures that prior to providing the federated data from the user system 204 to another system, it is not needed by the user system 204.

FIG. 6 illustrates OMDB application operational compartments 600, in accordance with embodiments of the present invention. In this way, there are various ways in which the OMDB 208 may perform its functions, as such there are several operational compartments that provide various functionality for the OMDB 208. The OMDB 208, through the OMDB application 256 may provide for various operational compartments such that the OMDB 208 may perform its functions with respect to the information technology infrastructure. First, as illustrated in block 402, the OMDB 208 has an online operational compartment. The online operational compartment 402 is designed to run and/or manage high performance data exchange and operations. Because of the high performance data exchange functionality of the online operational compartment 402 is capable of cloud interaction 408 and monitoring 410 of the information technology infrastructure. The cloud interaction 408 allows the OMDB 208 to communicate with the cloud 201 and the vendor systems 206 associated with the cloud 201. Furthermore, the OMDB 208 provides an intermediary between the cloud 201 and the rest of information technology infrastructure including the user systems 204. The online operational compartment 402 further allows for monitoring 410 of the information technology system during use.

As further illustrated in FIG. 6, the OMDB 208, through the OMDB application 256 may provide for an offline operational compartment 404. The offline operational compartment 404 allows the OMDB 208 to run efficiently without impacting the real-time online performance of the OMDB 208. As such, the offline operational compartment 404 allows for real-time data storage 412, such that any information that is collected by the OMDB 206 may be stored briefly in the real-time data storage 412 prior to being stored in backup or a repository. Furthermore, the offline operational compartment 404 allows for data queries 414 and transfers 416. Again, so there is no impact on the online operational compartment 402 of the OMDB 208 bulk data queries 414 may be directed to the offline operational compartment 404. In this way, the offline operational compartment 404 can respond and review data queries 414 without slowing down the operational speed of the OMDB 208 and the information technology infrastructure. The offline operational compartment 404 also allows for transfers 416 of information technology resources throughout the information technology infrastructure without slowing down the operational speed of the OMDB 208 and the information technology infrastructure. The transferring 416 or federation of data may occur based on the monitoring 410 of the information technology infrastructure from the online operational compartment 402.

As further illustrated in FIG. 6, the OMDB 208, through the OMDB application 256 may provide for a backup operational compartment 406. The backup operational compartment 406 provides an at real-time or close thereto copy of information technology resources 418 and the current status of the OMDB 208, in case of a malfunction in the online 402 and/or offline 404 operational compartments. The backup operational compartment 406 also comprises a Structured Query Language (SQL) application designed for managing data in relation to database management systems, such as those associated with the OMDB 208 and/or the information technology infrastructure.

FIG. 7 illustrates the modular components of the OMDB system 500, in accordance with embodiments of the invention. The modular components of the OMDB system, which are associated with the OMDB application 256 include, but are not limited to the automation intelligence workload manager 302, the resource manager 304, and the physical infrastructure 306.

The automation intelligence workload manager 302 provides the intelligent management of the information technology infrastructure. The automation intelligent workload manager 302 manages the workload of the information technology infrastructure. In this way, the workload manager 302 may monitor the workload of the systems of the information technology infrastructure such that information technology resources may be federated based on workload of the systems of the infrastructure.

FIG. 8 illustrates an overview of the intelligence workload manager monitoring systems within the information technology infrastructure network 700. The information technology infrastructure, in this embodiment comprises a single network 502. The network 502 comprises storage 506 in the form of NAS storage. The NAS storage 506 is a file-level computer data storage that is associated with the network 502 to allow data access across the network to heterogeneous hypervisor users 202. The OMDB may contain tables used to host storage related to performance and meta data statistics associated with the NAS storage 506.

The network 700 further comprises a controller 508. The controller aids in directing the designated files for NAS storage 506, monitoring the network 502, and for the SAN fabric 504. The SAN fabric 504 (storage area network fabric) spans the information technology infrastructure to connect the user systems 204, other workstations, or servers of the information technology infrastructure to storage devices such as the NAS storage 506 and the OMDB. The SAN fabric 504 allows for connectivity through all of the devices within the information technology infrastructure.

As illustrated in FIG. 8, the intelligence workload manager may monitor the systems within the information technology infrastructure network 502. In the illustration of FIG. 8, there are three different virtual local area networks (VLAN) 510 illustrated. However, one of ordinary skill in the art will appreciate that any number of VLAN may be present within the information technology infrastructure. As illustrated, VLAN1, VLAN2, and VLANx all comprising a plurality of hypervisors 512 within each of the VLANs. The hypervisors 512 are virtual managers of individual user systems 204 within an information technology infrastructure. As such, in the example illustrated in FIG. 8 there are three VLANs that each comprise a plurality of user systems 204 with hypervisors 512 virtually managing each of the user systems 204. The hypervisors 512 provide the OMDB with an indication as to the use of the information technology resources within each user system 204. For example, as illustrated in FIG. 8, one of the hypervisors 514 within VLANx is only using a limited number of the information technology resources deployed to the user system 204 associated with the hypervisor 514. Because the OMDB provides an intelligence workload manager that is capable of monitoring each of the information technology infrastructures, including the networks 502, VLANs 510, and individual hypervisors 512, 514 associated with each user system 204, the OMDB is capable of determining which user systems 204 may be over capacity or under capacity with respect to the information technology resources the user system 204 is utilizing.

FIG. 9 illustrates the intelligent management of the OMDB monitoring hypervisors within the information technology infrastructure 800, in accordance with embodiments of the invention. The automation intelligence workload manager 302 may continually update workload, resources, and state as illustrated in block 604 by being in constant communication with the user systems 204 through the system's hypervisors 605, 606, 608, 610. As illustrated, the hypervisors are monitored to determine the amount of information technology being used by each user system 204 and/or other system within the information technology infrastructure. The automation intelligence workload manager 302, in this embodiment, provides a monitoring display of all the hypervisors within an information technology infrastructure for the OMDB 208 to monitor.

As illustrated in FIG. 9 a monitoring display illustrates several different statuses within each hypervisor. A hypervisor that is utilizing approximately half of its designated information technology resources associated with it is illustrated as hypervisor 605. A hypervisor that is utilizing all of its information technology resources associated with it is illustrated as hypervisor 610. A hypervisor that is using none of the information technology resources associated with it is illustrated as hypervisor 606. A hypervisor that is using one third of the information technology resources associated with it is illustrated as hypervisor 608. In each of these cases the OMDB 208 may be able to drill down within each hypervisor to determine specifically what information technology resources are being utilized and what information technology resources are not being utilized. In this way, the OMDB 208 may pinpoint specific information technology resources, such as a particular program, memory, or the like that is not being utilized, such that it may determine federation for that specific information technology resources. Furthermore, the monitoring of the information technology infrastructure allows for monitoring of every information technology infrastructure component built, the information technology resources used for the builds, the data on the cloud, the inventory available, capacity available, performance, billing, building sequences, or the like that may be necessary to build and/or operate an information technology infrastructure for an entity.

In some embodiments, the monitoring of individual hypervisors with the ability to drill down to the individual information technology resources being utilized by the user system 204 may further allow the OMDB 208 to provide feedback with respect to the operational status of the information technology resources. For example, the monitoring of single information technology resources within a user system 204 may recognize an error or virus within an information technology resources within a single user system 204. As such, the recognized error may be sent in the form of feedback to a user 202 or other individual, such that the error may be monitored and/or fixed to ensure smooth operation of the rest of the information technology infrastructure.

FIG. 10 illustrates the intelligent management of the OMDB monitoring hypervisors and determining federation within the information technology infrastructure 900, in accordance with embodiments of the invention. As described above, the automation intelligence workload manager 302 constantly communicates with the information technology infrastructure and the hypervisors 605 thereon. The automation intelligence workload manager 302 continually updates workloads, resources, and states as illustrated in block 604. In the embodiment illustrated in FIG. 10, the OMDB 208 is utilizing the monitoring of the information technology infrastructure to determine the status of the user systems 204 and/or the like. For example, four of the hypervisors associated with user systems 204 within the information technology infrastructure are queued as requiring maintenance 802. The OMDB 208 may supply the data such that an intelligent workload manager can organize the hypervisors 802 that require similar maintenance together without having to slow down the OMDB 208 and/or the information technology infrastructure.

As further illustrated in FIG. 10, the automation intelligence workload manager 302 of the OMDB 208 may provide reserved hypervisors 804. These reserved hypervisors 804 may be reserved for several functions of the OMDB 208. For example, the OMDB 208 may be reserving these and the information data associated therewith in the cycling such that they may be federated.

Referring back to FIG. 7, the OMDB application 256 further comprises a modular component resource manager 304. FIG. 11 illustrates the modularization of the resource manager 304 of the OMDB 208. The resource manager 304 works with the automation intelligence workload manager 302 in order to operate the OMDB 208 and cloud 201 within the information technology infrastructure in order to optimize the information technology infrastructure for the entity.

As illustrated in FIG. 11, the resource manager 304 provides the application building and launching module 902, such that the systems within the information technology infrastructure may be built using the information technology resources associated with the cloud 201 and the OMDB 208. The resource manager 304 comprises modular component associated with the management of compute resource analysis 904, hypervisors 906, configuration management 908, identity management 910, network automation 914, provisions 916, system management integration 918, cloud intelligence management 922, hypervisor management 924, usage tracking 926, and storage 928.

The compute resource analysis 904 provides analysis and/or monitoring of data associated with the computing resources used within the information technology infrastructure. For example, it may monitor the capacity, speed, program capabilities, and the like of any one or more systems within the information technology infrastructure.

The hypervisors 906 and the hypervisor management 924 are also managed by the resource manager 304. In this way, each hypervisor 906 that allows individual systems to share a single host system can be monitored and/or managed singularly or in combination with a group of hypervisors 906 to ensure that they are properly working and communicating with the host system.

The configuration management 908 allows modular management of how each of the user systems 204, hypervisors, and/or other systems on the information technology infrastructure are configured to operate together within the information technology infrastructure and furthermore how they communicate with one another.

The network automation 914 allows for modular management of the network within the information technology infrastructure. In this way, the network or networks within the information technology infrastructure may be monitored, automated, maintained, and transitioned based on use and/or the like.

The system management integration 918 allows for integration into one modular management component the management of all aspects associated with the information technology infrastructure, such as the cloud 201, OMDB 208, user systems 204, and the like. This way, in some embodiments, one modular component may be able to quickly access, allow user 202 visualization, and management of the entire information technology infrastructure.

The cloud intelligence management 922 allows for modular management of the cloud 201 and who is able to access the cloud 201. In this way, the cloud intelligence management 922 may determine which vendors may provide information technology on the cloud 201, which users 202 of the information technology infrastructure may access the cloud 201, and what type of information technology resources are allowed on the cloud 201. Furthermore, the cloud intelligence management 922 may monitor what type of information technology resources are on the cloud 201 and what type of information technology resources may need to be on the cloud 201. As such, the cloud intelligence management 922 may be able to reach out to vendors, or the like. that may provide specific information technology resources and allow them access to the cloud 201 to put that information technology on the cloud 201.

The usage tracking 926 allows for modular tracking of usage of various components of the information technology infrastructure. In some embodiments, the usage tracking 926 may track the entire information technology infrastructure. In some embodiments, the usage tracking 926 may track one or more single networks, user systems 204, hypervisors, and/or the like. In this way, the usage tracking 926 may track a single component, several components, and/or the entire information technology infrastructure.

The storage 928 allows for modular storage of the components required for operating the resource manager 304 and the components therein. The provisions 916 allow for the options and/or utilization functions of the resource manager 304.

Referring back to FIG. 7 the OMDB application 256 further illustrates a physical infrastructure 306. The physical infrastructure 306 includes the hardware and other physical components of the information technology infrastructure that may also require monitoring, updating, repairing, and the like. In this way, although the OMDB 208 may not be able to push and/or pull physical infrastructures between various locations of the information technology infrastructure, like the OMDB 208 can with information technology resources. The OMDB 208 may still be able to provide real-time management, monitoring, and feedback relating to the physical infrastructure 306 of the information technology infrastructure.

The following U.S. patent applications are filed concurrently with the present application on November 15, present application on Nov. 15, 2012 and are hereby incorporated by reference: U.S. patent application Ser. No. 13/678,415 to Prentice O. Dees Jr., et al. and entitled "End to End Modular Information Technology System"; U.S. patent application Ser. No. 13/678,424 to Prentice O. Dees Jr., et al. and entitled "Host Naming Application Programming Interface"; U.S. patent application Ser. No. 13/678,419 to Ronald Engle, et al. and entitled "Storage Black Box"; and U.S. patent application Ser. No. 13/678,414 to Ronald Engle, et al. and entitled "Capacity Reclamation and Resource Adjustment";

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing aggregation of vendor and entity data for an information technology infrastructure, the system comprising:
    a memory device with computer-readable program code stored thereon;
    a communication device;
    a processing device operatively coupled to the memory device and the communication device, wherein the processing device is configured to execute the computer-readable program code to:
    receive information technology resources at a platform, wherein the information technology resources comprises data that an entity requests for use within the information technology infrastructure;
    determine the information technology resources on the platform necessary for deploying and building components within the information technology infrastructure, such that the information technology resources are deployable in a step-by-step sequence for building the components within the information technology infrastructure;
    create a dynamic list comprising of the information technology resources that are required for building the components and a step-by-step sequence for building the components, wherein the dynamic list is stored in real-time and wherein the information technology resource, the platform, and the dynamic list is stored offline;
    deploy the information technology resources in the step-by-step sequence for building of a user system within the information technology infrastructure, wherein the deployment is automated and does not require user activation or involvement to deploy the information technology resources from the platform;
    monitor, in real-time, the information technology infrastructure including the platform, user systems, and the information technology resources being utilized within the information technology infrastructure; and
    federate information technology resources from a first user system to a second user system, wherein the federation of information technology resources is based on a determination, via the monitoring, that the first user system is underutilizing the information technology resources and the second user system is utilizing the information technology resource to capacity, wherein the underutilized information technology resources are removed from the first user system and queued to be cycled into the second user system.

2. The system of claim 1, wherein the processing device is further configured to provide offline maintenance for the information technology infrastructure, wherein the maintenance is determined independent of user indication of a problem, via the monitoring of the information technology infrastructure including the platform, user systems, and the information technology resources being utilized within the information technology infrastructure.

3. The system of claim 1, wherein the monitoring of the information technology infrastructure includes monitoring, in real-time, the inventory, capacity, performance, billing, and sequence of the components of the information technology infrastructure.

4. The system of claim 1, wherein the platform comprises a cloud, wherein the cloud allows for real-time access to a shared pool of information technology resources, wherein the cloud is accessible by vendors and users of the information technology infrastructure.

5. The system of claim 1, wherein the processing device is further configured to comprise an intelligent platform manager that determines communications between the user system and the platform.

6. The system of claim 1, wherein determining the information technology resources on the platform necessary for deploying and building components within the information technology infrastructure further comprises:
    determining information technology resources required for deploying and building components within the information technology infrastructure that is not on the platform;
    communicating with external sources to obtain the information technology resources required for deploying and building components within the information technology infrastructure that is not on the platform; and
    providing, to the platform the information technology resources required for deploying and building components within the information technology infrastructure that is not on the platform.

7. A computer program product for providing aggregation of vendor and entity data for an information technology infrastructure, the computer program product comprising at least one non-transitory computer-readable medium having computer-readable program code portions embodied therein, the computer-readable program code portions comprising:
    an executable portion configured for receiving information technology resources at a platform, wherein the information technology resources comprises data that an entity requests for use within the information technology infrastructure;

an executable portion configured for determining the information technology resources on the platform necessary for deploying and building components within the information technology infrastructure, such that the information technology resources are deployable in a step-by-step sequence for building the components within the information technology infrastructure;

an executable portion configured for creating a dynamic list comprising of the information technology resources that are required for building the components and a step-by-step sequence for building the components, wherein the dynamic list is stored in real-time and wherein the information technology resource, the platform, and the dynamic list is stored offline;

an executable portion configured for deploying the information technology resources in the step-by-step sequence for building of a user system within the information technology infrastructure, wherein the deployment is automated and does not require user activation or involvement to deploy the information technology resources from the platform;

an executable portion configured for monitoring, in real-time, the information technology infrastructure including the platform, user systems, and the information technology resources being utilized within the information technology infrastructure; and an executable portion configured for federating information technology resources from a first user system to a second user system, wherein the federation of information technology resources is based on a determination, via the monitoring, that the first user system is underutilizing the information technology resources and the second user system is utilizing the information technology resource to capacity, wherein the underutilized information technology resources are removed from the first user system and queued to be cycled into the second user system.

8. The computer program product of claim 7 further comprising an executable portion configured for providing real-time offline storage of the information technology resources, the platform, the information technology infrastructure, and individual user systems of the information technology resources.

9. The computer program product of claim 7 further comprising an executable portion configured for providing offline maintenance for the information technology infrastructure, wherein the maintenance is determined independent of user indication of a problem, via the monitoring of the information technology infrastructure including the platform, user systems, and the information technology resources being utilized within the information technology infrastructure.

10. The computer program product of claim 7, wherein the monitoring of the information technology infrastructure includes monitoring, in real-time, the inventory, capacity, performance, billing, and sequence of the components of the information technology infrastructure.

11. The computer program product of claim 7, wherein the platform comprises a cloud, wherein the cloud allows for real-time access to a shared pool of information technology resources, wherein the cloud is accessible by vendors and users of the information technology infrastructure.

12. The computer program product of claim 7, wherein the processing device is further configured to comprise an intelligent platform manager that determines communications between the user system and the platform.

13. The computer program product of claim 7, wherein determining the information technology resources on the platform necessary for deploying and building components within the information technology infrastructure further comprises:

determining information technology resources required for deploying and building components within the information technology infrastructure that is not on the platform;

communicating with external sources to obtain the information technology resources required for deploying and building components within the information technology infrastructure that is not on the platform; and providing, to the platform the information technology resources required for deploying and building components within the information technology infrastructure that is not on the platform.

14. A method for providing aggregation of vendor and entity data for an information technology infrastructure, the method comprising:

receiving information technology resources at a platform, wherein the information technology resources comprises data that an entity requests for use within the information technology infrastructure;

determining the information technology resources on the platform necessary for deploying and building components within the information technology infrastructure, such that the information technology resources are deployable in a step-by-step sequence for building the components within the information technology infrastructure;

creating a dynamic list comprising of the information technology resources that are required for building the components and a step-by-step sequence for building the components, wherein the dynamic list is stored in real-time and wherein the information technology resource, the platform, and the dynamic list is stored offline;

deploying the information technology resources in the step-by-step sequence for building of a user system within the information technology infrastructure, wherein the deployment is automated and does not require user activation or involvement to deploy the information technology resources from the platform;

monitoring, in real-time, the information technology infrastructure including the platform, user systems, and the information technology resources being utilized within the information technology infrastructure; and federating, via a computer device processor, information technology resources from a first user system to a second user system, wherein the federation of information technology resources is based on a determination, via the monitoring, that the first user system is underutilizing the information technology resources and the second user system is utilizing the information technology resource to capacity, wherein the underutilized information technology resources are removed from the first user system and queued to be cycled into the second user system.

15. The method of claim 14, wherein the monitoring of the information technology infrastructure includes monitoring, in real-time, the inventory, capacity, performance, billing, and sequence of the components of the information technology infrastructure.

16. The method of claim 14, wherein the platform comprises a cloud, wherein the cloud allows for real-time access to a shared pool of information technology resources, wherein the cloud is accessible by vendors and users of the information technology infrastructure.

17. The method of claim 14 further comprising an intelligent platform manager that determines communications between the user system and the platform.

18. The method of claim 14, wherein determining the information technology resources on the platform necessary for deploying and building components within the information technology infrastructure further comprises:
   determining, via a computer processing device, information technology resources required for deploying and building components within the information technology infrastructure that is not on the platform;
   communicating with external sources to obtain the information technology resources required for deploying and building components within the information technology infrastructure that is not on the platform; and
   providing, to the platform the information technology resources required for deploying and building components within the information technology infrastructure that is not on the platform.

\* \* \* \* \*